Patented June 6, 1939

2,161,538

UNITED STATES PATENT OFFICE 2,161,538

ASYMMETRIC ARSENO COMPOUNDS

Karl Streitwolf, deceased, late of Frankfort-on-the-Main, by Frieda Streitwolf, Frankfort-on-the-Main, Germany, administratrix, and Alfred Fehrle, Bad Soden in Taunus, and Walter Herrmann, Frankfort-on-the-Main-Hochst, Germany, assignors to Winthrop Chemical Company, Inc., New York, N. Y., a corporation of New York No Drawing. Original application December 23, 1930, Serial No. 504,414. Divided and this application March 2, 1937, Serial No. 128,692. In Germany July 22, 1930

4 Claims. (Cl. 260—300)

This application is a division of application Serial No. 504,414, now Patent 2,095,577, filed December 23, 1930.

The present invention relates to asymmetric arseno compounds, more particularly to compounds of the following general formula:

wherein X stands for a phenyl-pyrazolone, Y stands for an aryl radical, which radicals X and Y may be substituted, in every case at least one of the radicals X and Y containing as a substituent of the aryl nucleus a substituted amino group and Z stands for hydrogen or an alkali metal.

Arsenobenzene derivatives, which are used as a remedy have been transformed into water-soluble preparations of neutral reaction. The compounds thus obtained have a good action when intravenously injected, but they are not tolerated when subcutaneously or intramuscularly injected, on account of the very strongly irritating effect.

Now we have found that compounds of general application are made by reducing to asymmetric arsenobenzenes phenoxy-acetic acid-arsonic acids or aryl-arsonic acids which have an imidazole ring containing glycolic acid as substituent, together with other therapeutically active aryl-arsonic acids, or by producing the asymmetric arseno-benzenes according to known methods from the derivatives of the corresponding arsonic acids containing trivalent arsenic and in cases in which the product to be obtained contains a primary amino group or groups, acylating such group or groups or causing the arsenobenzene to react with compounds capable of condensing with a primary amino group such as formaldehyde-bisulfite or glycide.

These new compounds have, as is required in modern therapy, a good action when intravenously, subcutaneously or intramuscularly injected and are well tolerated.

The following examples illustrate the invention, but they are not intended to limit it thereo:

1. 7.25 grams of 2-methyl-4-phenoxyacetic acid-arsonic acid and 7.2 grams of 4-amino-2.3-dimethyl-5-pyrazolone-1-phenyl-para-arsonic acid are dissolved respectively in 28 cc. of 2N-caustic soda solution and 28 cc. of water and in 15.5 cc. of 2N-caustic soda solution and 15.5 cc. of water. 250 cc. of water are added to the combined solutions. The mixture is reduced at 65° C. by means of 98 grams of hydrosulfite. The separated arsenic compound is dissolved in 50 cc. of methyl alcohol and 150 cc. of water at 50° C. By introducing the solution, while stirring, into 10 parts by volume of acetone the solid compound is caused to separate. It dissolves in water to a clear and neutral solution.

The product is transformed by formaldehyde-bisulfite by dissolving 9 grams of it in 25 cc. of methyl alcohol and 50 cc. of water, and adding 6 grams of sodium formaldehyde-bisulfite to the solution. The whole is stirred at 50° C. until a test portion is no longer diazotizable. The filtered solution is introduced, while stirring, into 10 parts by volume of absolute alcohol. The precipitated product dissolves in water to a clear and neutral solution. The product obtained has the following formula:

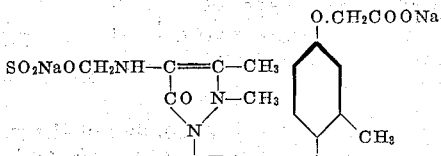

2. 16.6 grams of 3-acetylamino-4-phenoxy-acetic acid-1-arsonic acid, dissolved in 56 cc. of 2N-caustic soda solution and 56 cc. of water, and 16.7 grams of 4-amino-2.3-dimethyl-5-pyrazolone-1-phenyl-para-arsonic acid, dissolved in 31 cc. of 2N-caustic soda solution and 31 cc. of water are mixed together and, after addition of 500 cc. of water the mixture is reduced by means of 195 grams of hydrosulfite. The separated arsenic compound is dissolved in 150 cc. of methyl alcohol and 75 cc. of water at 50° C. and filtered. By introducing the filtrate, while stirring, into 5 parts by volume of acetone, the product separates in a solid form.

17 grams of this compound are dissolved in 80 cc. of water and 9 grams of sodium formaldehyde-bisulfite are added. The whole is then stirred at 50° C. until a test portion can no longer be diazotized. The filtered solution is introduced, while stirring, into 10 parts of methyl alcohol and 5 parts of ether are added thereto. The solid product, filtered by suction, dissolves in water to a clear and neutral solution. The product obtained has the following formula:

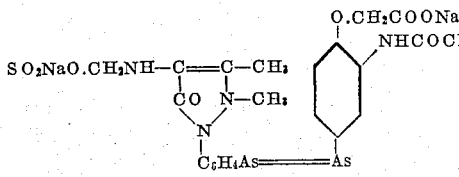

3. A mixture of 8.2 grams of 4-amino-2,3-dimethyl-5-pyrazolone-1-phenyl-para-arsonic acid, dissolved in 15.5 cc. of 2N-caustic soda solution and 15.5 cc. of water, and 7.25 grams of 3-methyl-4-phenoxy-acetic acid-1-arsonic acid, dissolved in 28 cc. of 2N-caustic soda solution and 28 cc. of water, is, after addition of 250 cc. of water, reduced by means of 98 grams of hydrosulfite. The separated arsenic compound is stirred with 100 cc. of methyl alcohol and dissolved by addition of 70 cc. of water at 50° C. The filtered solution is introduced, while stirring, into 10 parts by volume of acetone. The arsenic compound which separates dissolves in water to a clear and neutral solution.

10 grams of this arsenic compound are dissolved in 25 cc. of methyl alcohol and 50 cc. of water and transformed at 50° C. by means of 6 grams of sodium formaldehyde-bisulfite. The filtered solution is introduced, while stirring, into 10 parts by volume of absolute alcohol in order to precipitate the product in a solid form. The product dissolves in water to a neutral solution. The product obtained has the following formula:

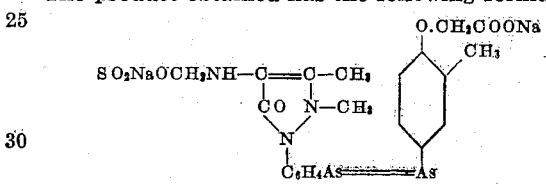

We claim:
1. The compounds of the following formula:

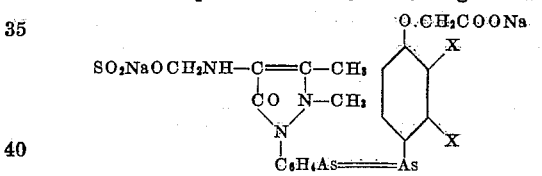

wherein one X represents a member of the group consisting of $CH_3$ and $-NH.CO.CH_3$ and the other X represents hydrogen, readily dissolving in water to neutral solutions of good efficacy and tolerability when applied intravenously, subcutaneously or intramuscularly.

2. The compound of the following formula:

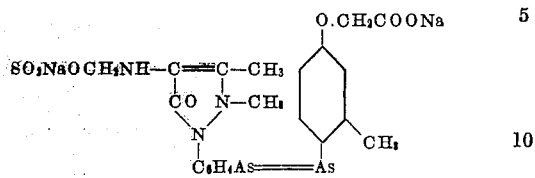

readily dissolving in water to a neutral solution of good efficacy and tolerability when applied intravenously, subcutaneously or intramuscularly.

3. The compound of the following formula:

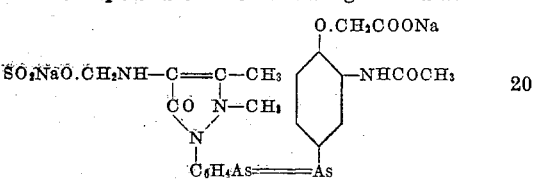

readily dissolving in water to a neutral solution of good efficacy and tolerability when applied intravenously, subcutaneously or intramuscularly.

4. The compound of the following formula:

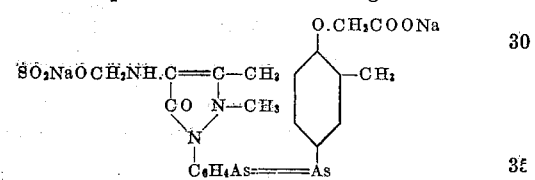

readily dissolving in water to a neutral solution of good efficacy and tolerability when applied intravenously, subcutaneously or intramuscularly.

FRIEDA STREITWOLF,
*Administratrix of Karl Streitwolf, Deceased.*

ALFRED FEHRLE.
WALTER HERRMANN.